United States Patent [19]

Vershure

[11] Patent Number: 4,899,536
[45] Date of Patent: Feb. 13, 1990

[54] STARTING SYSTEM FOR A TURBINE ENGINE

[75] Inventor: Roy W. Vershure, Escondido, Calif.

[73] Assignee: Sundstrand Corporation, Rockford, Ill.

[21] Appl. No.: 222,542

[22] Filed: Jul. 21, 1988

[51] Int. Cl.⁴ .............................. F02C 7/27
[52] U.S. Cl. .................... 60/39.142; 60/726; 60/730; 60/259; 60/260
[58] Field of Search ............ 60/39.06, 93.141, 39.142, 60/39.461, 39.36, 257, 259, 260, 760, 730, 726

[56] References Cited

U.S. PATENT DOCUMENTS

| | | | |
|---|---|---|---|
| 2,573,471 | 10/1951 | Malina et al. | 60/39.461 |
| 2,641,904 | 6/1953 | Bouffart | 60/260 |
| 2,643,511 | 6/1953 | Briggs . | |
| 2,708,342 | 5/1955 | Allen et al. | 60/39.141 |
| 2,935,846 | 5/1960 | Neale et al. | 60/259 |
| 3,017,745 | 1/1962 | Shirley et al. | 60/259 |
| 3,040,520 | 6/1962 | Rae | 60/260 |
| 3,229,463 | 1/1966 | Dryden . | |
| 3,468,332 | 12/1969 | Robertson et al. . | |
| 3,844,112 | 10/1974 | Harrison | 60/39.141 |
| 4,161,102 | 7/1979 | Jasas et al. . | |
| 4,815,277 | 3/1989 | Vershure, Jr. et al. | 60/39.142 |

*Primary Examiner*—Donald E. Stout
*Attorney, Agent, or Firm*—Wood, Dalton, Phillips, Mason & Rowe

[57] ABSTRACT

Difficulties in starting turbine engines 10 at high altitudes are avoided in a starting system which includes a combustor 34 having a gas outlet 32 adapted to be in communication with a turbine engine nozzle 28, a fuel inlet 36, and an oxidant inlet 38 so that fuel may be oxidized within the combustor 34 by an oxidant to provide hot gases at the outlet 32. The system includes a first pressure vessel 58 adapted to receive liquid oxygen and a second pressure vessel 60 adapted to receive liquid nitrogen. Pumps 62, 64, and conduits 56, 54, 68 establish a flow path between the vessels 58, 60 and the oxidant inlet 38 while a mixing valve 66 is disposed in the flow path to mix the oxygen and nitrogen flowing therein in a desired proportion.

12 Claims, 1 Drawing Sheet

STARTING SYSTEM FOR A TURBINE ENGINE

FIELD OF THE INVENTION

This invention relates to a starting system for a turbine engine, and more specifically, a starting system for such an engine that is operative over a wide range of differing environmental conditions.

BACKGROUND OF THE INVENTION

Recent years have seen increasing consideration of so-called fly-by-wire aircraft operating systems. In fly-by-wire aircraft, the aircraft control surfaces are not mechanically and/or hydraulically linked to the controls operated by the pilot or by an automatic pilot. Rather, the controls in the control surfaces are linked electrically.

Consequently, in order to maintain control over a fly-by-wire aircraft, it is necessary that electric power be present at all times during flight. Since there is always the possibility that an electrical generator driven by a main propulsion engine might fail for any of a variety of reasons, most fly-by-wire aircraft systems include provision for one or more power generating units that is not operated by the main propulsion engine or engines, but rather, by a separate turbine. Typically, such power units are in the form of auxiliary power units (APU), emergency power units (EPU), or both, or a combined auxiliary-emergency power unit.

In any event, where electrical power is lost, it is necessary that it be restored within two to three seconds to enable control over the aircraft to be regotten. This means that the source of electrical power during the emergency, whether an APU or and EPU or a combined APU/EPU must be started and brought up to operating speed extremely rapidly.

While under many conditions, this is not a particularly difficult chore, as altitude increases, the thinness of the air and the resultant scarcity of oxygen on a mass basis make it not only difficult to start the turbine engine of the power unit, but difficult to accelerate it to full operating speed as well.

The present invention is directed to overcoming one or more of the above problems.

SUMMARY OF THE INVENTION

It is the principal object of the invention to provide a new and improved starting system for a turbine engine. More specifically, it is an object of the invention to provide such a starting system which will provide reliable starting of the turbine engine through a vast range of substantially differing environmental conditions and wherein the turbine engine is rapidly brought up to operating speed.

An exemplary embodiment of the invention is adapted for use with a turbine engine including a rotatable turbine wheel and a nozzle for directing hot gasses against the turbine wheel to impart a rotative force thereto. The system includes a combustor having a gas outlet adapted to be in fluid communication with a turbine engine nozzle, a fuel inlet and an oxidant inlet so that fuel may be oxidized within the combustor by an oxidant to provide hot gases at the outlet. A first pressure vessel is adapted to receive a first oxidant component and a second pressure vessel is adapted to receive a second oxidant component. Means establish a flow path between the vessels on the one hand and the oxidant inlet on the other and include a section in heat exchange relation with the combustor. Mixing means in the flow path establishing means are provided for mixing the oxidant components as they flow therein to provide oxidant to the oxidant inlet.

In a preferred embodiment, the first pressure vessel is adapted to store liquid oxygen and the second pressure vessel is adapted to store liquid nitrogen.

The invention contemplates that the mixing means mix oxygen and nitrogen in some desired proportion. In a highly preferred embodiment, the proportion will be such that oxygen is present in a greater amount than is found in air.

In one embodiment of the invention, the mixing means is upstream of the heat exchange section while in a highly preferred embodiment, the mixing means is downstream of the heat exchange section.

The invention also contemplates the provision of means for injecting fuel into the combustor near the outlet to dilute gases of combustion resulting from the combustion of fuel from the fuel inlet and oxidant from the oxidant inlet.

A conduit may be provided to interconnect the nitrogen containing vessel and fuel inlet and means are provided for controlling flow through the conduit whereby nitrogen from the second vessel may be selectively utilized to purge the fuel inlet.

According to the invention, pump means for pumping the oxidant components from their respective vessels may be provided. In a highly preferred embodiment, the pump means comprise two pumps, one for each of the vessels, and they are located in the flow path establishing means upstream of the mixing means.

The invention also contemplates that the system be in combination with a turbine engine having a rotatable turbine wheel and a nozzle for directing hot gases against such turbine wheel.

Other objects and advantages will become apparent from the following specification taken in connection with the accompanying drawings.

DESCRIPTION OF THE INVENTION

Figure 1:
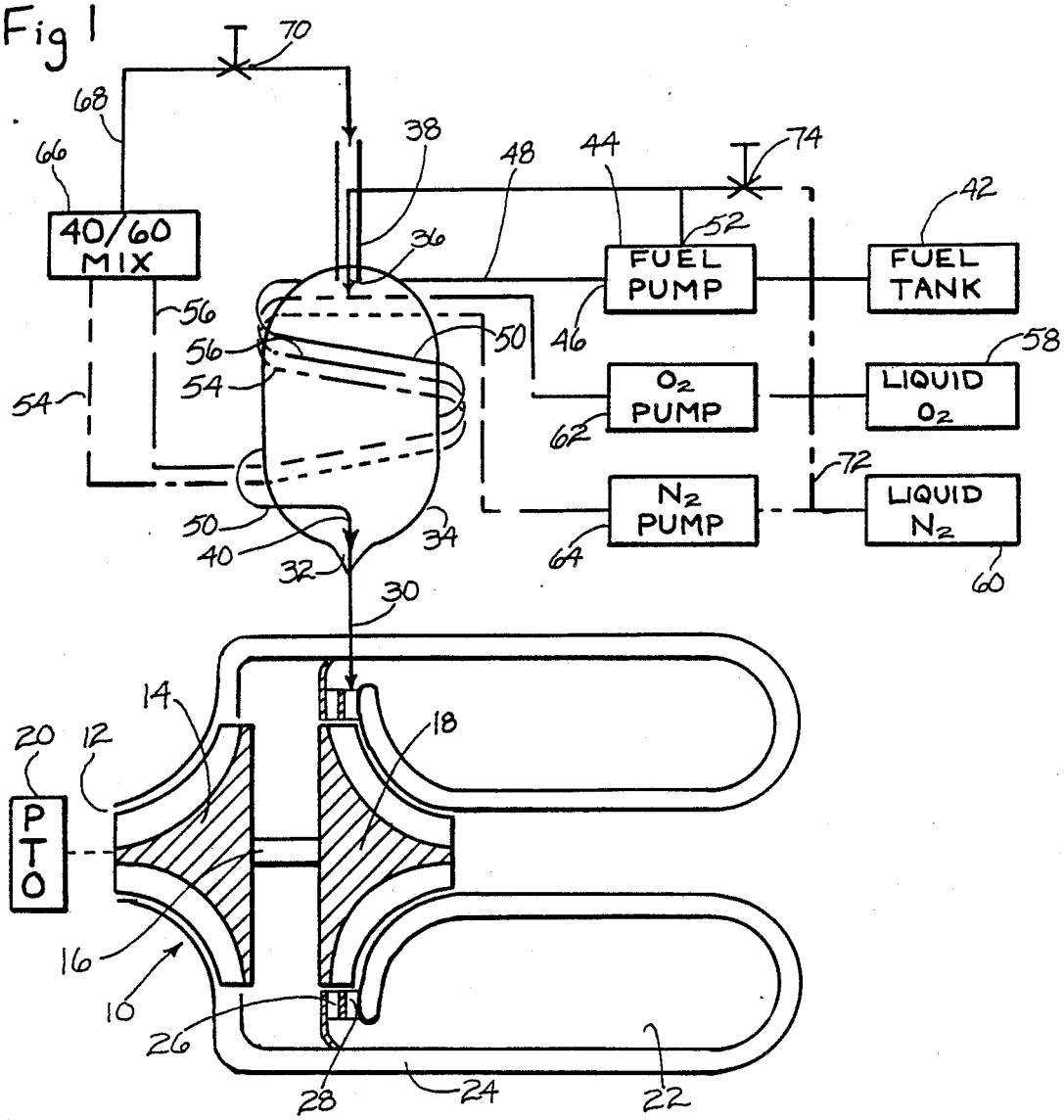
FIG. 1 is a schematic of a preferred embodiment of a starting system made according to the invention and a turbine engine with which it is adapted to be used.

An exemplary embodiment of the invention is illustrated in FIG. 1 in connection with a turbine engine, generally designated 10. The turbine engine includes an inlet 12 in which is disposed a rotatable, axial intake, radial discharge compressor 14, on one end of a shaft 16 journaled by any suitable means (not shown). Also mounted on the shaft 16 is a radial inflow, axial discharge turbine wheel 18. As is known, when the turbine wheel 18 is driven by hot gases, it will rotate the compressor 14 to provide compressed gas to support combustion that in turn is used to provide hot gases for driving the turbine wheel 18.

In addition, a power take-off unit 20 such as generator, hydraulic pump or the like is coupled to the rotary components of the engine 10 to be driven thereby.

As illustrated, the engine 10 includes an annular combustor 22 which may receive compressed air from the compressor 14 via a plenum 24. The combustor 24 includes an outlet nozzle 26 that is annular in form and which is directed against the turbine wheel 18.

In normal operation, air is received from the inlet 12 and compressed to be delivered to the combustor 22 where it is mixed with fuel and burned. The resulting hot gases of combustion exit the combustor 22 through the nozzle 26 to drive the turbine wheel 18.

According to the invention, an auxiliary nozzle 28 of annular configuration about the turbine wheel 18 may also be provided. The nozzle 28 is used during starting of the turbine engine 10 and for greater detail concerning the dual nozzle configuration of the turbine engine 10, reference may be had to the commonly assigned, co-pending application of Vershure et al, Ser. No. 001,818 filed Jan. 8, 1987 and entitled "Integrated Power Unit", now U.S. Pat. No. 4,815,277, the details of which are herein incorporated by reference.

According to the invention, a stream of hot gas for starting the turbine engine 10 is directed to the auxiliary nozzle 28 via a duct shown schematically at 30. The duct 30 is connected to the outlet 32 of an auxiliary combustor 34. The auxiliary combustor 34 includes a fuel inlet 36 and an oxidant inlet 38. Frequently, the inlets 36 and 38 will be located oppositely of the outlet 32. In addition, near the outlet 32 is a second fuel inlet 40.

Fuel entering the inlet 36 is combusted with oxidant entering the combustor 34 through the inlet 38 and the resulting gases of combustion exit via the outlet 32 to ultimately impinge against the turbine wheel 18. At the same time, fuel may be added to the hot gas stream exiting the outlet 32 by injecting fuel through the inlet 40. This fuel will normally not burn, but rather, serves as a diluant for the hot gases of combustion exiting the combustor 34. Such fuel vaporizes to cool the gases of combustion to a suitable temperature for application to the auxiliary nozzle 28 and in addition, increases the mass flow rate of gas flowing to the turbine engine 10 to initiate the starting thereof.

Fuel for the foregoing is obtained from a fuel tank 42 which is fed to a fuel pump 44. One outlet 46 of the fuel pump is connected to a line 48 which, as schematically shown at 50, spirals around the combustor 34 in heat exchange relation therewith to ultimately terminate in the fuel injection inlet 40. Thus, the fuel serves to cool the combustor 34 to extend its life.

The same or a second outlet 52 from the fuel pump 44 extends to the fuel inlet 36 to provide fuel for combustion within the combustor 34.

A combustor including provision for all of the foregoing is disclosed in the commonly assigned application of J. Shekleton, Ser. No. 123,303, filed Nov. 27, 1987, entitled "Hot Gas Generator", the details of which are herein incorporated by reference.

In addition to the fuel conduit 50 wrapped about the combustor 34, two additional conduits 54 and 56 may be similarly wrapped about the same to likewise be in heat exchange relation therewith. The conduits 54 and 56 may be interleaved with the conduit 50 and thus formed according to the teachings of the aforementioned application of Shekleton.

According to the invention, oxidant to be directed to the interior of the combustor 34 via the oxidant inlet 38 is made up of two or more components. In a preferred embodiment, one component is liquid oxygen housed in a pressure vessel 58 and the other is liquid nitrogen housed in a pressure vessel 60. The vessel 58 is connected via a pump 62 to the conduit 56 while the vessel 60 is connected via a pump 64 to the conduit 54.

The conduits 54 and 56 extend to a mixing valve 56 which mixes the two constituents of the oxidant in the desired proportion. In a preferred embodiment, the mixing valve is adapted to mix at a ratio of 40% oxygen to 60% nitrogen. This provides and air-like oxidant that is oxygen enriched. This mixture is more effective in supporting combustion within the combustor 34 because of the fact it is enriched with oxygen but avoids a number of the difficulties that would be present if pure oxygen were to be used as the oxidant.

In any event, the mixture passes from the mixing valve 66 via a conduit 68 and through a control valve 70 to the oxidant inlet 38.

The liquid constituents of the oxidant are vaporized by the absorption of heat as they cool the combustor 34 and are pressurized in the process, hence the need for the pumps 62, 64. The resulting vapors are mixed by the mixing valve 66 and fed to the interior of the combustor 34 to burn fuel and generate hot gas sufficient to start, and rapidly accelerate, the turbine engine 10.

Once the turbine engine 10 is accelerated to some predetermined percentage of rated speed, its operation will be self-sustaining and combustion within the combustor 34 is halted. When that occurs, residual heat in the combustor 34 could cause what amounts to destructive distillation of fuel still in the inlet 36. To avoid this difficulty, a conduit 72 extends from the outlet of the nitrogen containing vessel 60 and, via a control valve 74, is connected to the outlet 52 of the fuel pump 44 which feeds the fuel inlet 36. Upon shut-down of the system, the valve 74 may be opened momentarily to purge the fuel inlet 36 of any residual fuel remaining therein to thereby prevent clogging of the same by coking or destructive distillation of such fuel. If need be, the line 50 can be similarly purged.

In the preferred embodiment of the invention, the mixing valve 66 is located downstream of those portions of the conduits 54 and 56 which are in heat exchange relation at the combustor 34. As a consequence, the mixing valve 66 receives the oxidant constituents in vapor form rather than in liquid form. This is desirable in the sense that with present day mixing valve technology, it is far simpler to apportion with precision the oxidant constituents when they are in the vapor form than would be the case if they were in the liquid form.

However, in some instances, it may be desired to proportion the oxidant constituents and mix the same while they are in the liquid form. When this is the case, the embodiment of the invention illustrated in FIG. 2 may be utilized. In this particular case, the lines 76 and 78 respectively extend from the pressure vessels 58 and 60 to the mixing valve 66. The mixing valve 66 has an outlet connected to a line 80 which is wrapped around the combustor 34 to be in heat exchange relation. The line 80 will be interleaved with the fuel line 50 and will ultimately connect to the control valve 70.

Figure 2:
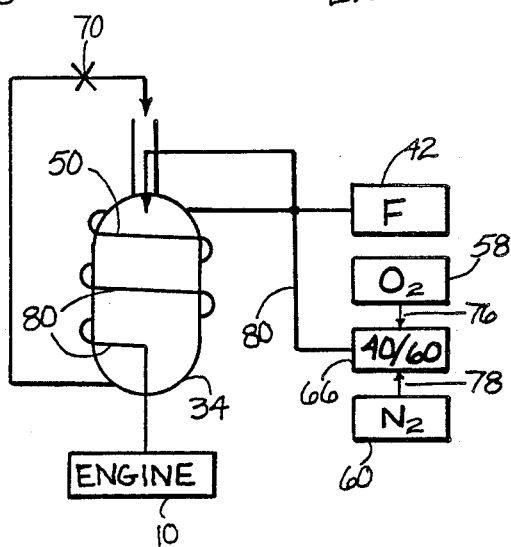
FIG. 2 is a somewhat fragmentary schematic of a modified embodiment of the invention.

Thus, other than the relocation of the mixing valve 66 and the omission of the conduits 56 and 54 in favor of the conduit 80, the system of FIG. 2 may be regarded as generally identical to that illustrated in FIG. 1.

In either embodiment, so-called "boil-off" in the tank 58 for the liquid oxygen may be utilized to provide the necessary gaseous oxygen required to initiate combustion. Once combustion has been initiated, sufficient heat will be generated to continue to vaporize the gases.

From the foregoing, it will be appreciated that the starting system of the present invention is ideally suited for starting turbine engines over a wide range of variation and environmental conditions, including specifically, at high altitudes. Because the system provides for storage of the oxidant utilized to combust fuel, oxygen scarcity under environmental conditions is not encountered as would be the case when trying to start a turbine engine at high altitude utilizing ambient air. As noted earlier, the use of a two constituent oxidant such as a combination of oxygen and nitrogen in a manner that effectively forms an oxygen enriched, air-like mixture not only enhances combustion, but avoids difficulty that may be encountered in handling other oxidants such as pure oxygen For example, stoichiometric combustion using the enriched air-like mixture will occur at a significantly lower temperature which, in turn, extends the life of system components that are exposed to the temperatures of combustion.

As a consequence, reliable and rapid starting of turbine engines is obtained through use of the invention.

Finally, while the invention has been illustrated and described in connection with a relatively small turbine engine, those skilled in the art will recognize that the principles of the invention are applicable to large engines, including the main propulsion engines of aircraft, as well.

I claim:

1. A starting system for a turbine engine including a rotatable turbine wheel and a nozzle for directing hot gases against the turbine wheel to impart a rotative force thereto, said system comprising:
   a combustor having a gas outlet adapted to be in fluid communication with a turbine engine nozzle, a fuel inlet and an oxidant inlet so that fuel may be oxidized within said combustor by an oxidant to provide hot gases at the outlet;
   a first pressure vessel adapted to receive liquid oxygen;
   a second pressure vessel adapted to receive liquid nitrogen;
   means establishing a flow path between said vessels on the one hand and said oxidant inlet on the other, including a section in heat exchange relation with said combustor; and
   mixing means in said flow path establishing means for mixing oxygen and nitrogen flowing therein in a desired proportion.

2. The system of claim 1 wherein said mixing means is upstream of said section.

3. The system of claim 1 wherein said mixing means mixes the oxygen and nitrogen in a desired proportion whose oxygen content exceeds that found in air to provide an oxygen enriched, air-like mixture to said oxidant inlet.

4. The system of claim 1 wherein said mixing means is downstream of said section.

5. The system of claim 4 further including means for injecting fuel into said combustor near said outlet to dilute gases of combustion resulting from the combustion of fuel from said fuel inlet and oxidant from said oxidant inlet.

6. The system of claim 1 further including a conduit interconnecting said second vessel and said fuel inlet; and means for controlling flow through said conduit whereby nitrogen from said second vessel may be selectively utilized to purge said fuel inlet.

7. The system of claim 1 further including pump means for pumping oxygen and nitrogen from said vessels to said oxidant inlet.

8. The system of claim 7 wherein said pump means comprise two pumps, one for each of said vessels, and located in said flow path establishing means upstream of said mixing means.

9. A turbine engine including;
   a rotatable turbine wheel;
   a nozzle for directing hot gases against the turbine wheel to impart a rotative force thereto;
   a combustor having a gas outlet in fluid communication with said turbine engine nozzle, a fuel inlet and an oxidant inlet so that fuel may be oxidized within said combustor by an oxidant to provide hot gases at the outlet;
   a first pressure vessel adapted to receive liquid oxygen;
   a second pressure vessel adapted to receive liquid nitrogen;
   means establishing a flow path between said vessels on the one hand and said oxidant inlet on the other, including a section in heat exchange relation with said combustor; and
   mixing means in said flow path establishing means for mixing oxygen and nitrogen flowing therein in a desired proportion.

10. A starting system for a turbine engine including a rotatable turbine wheel and a nozzle for directing hot gases against the turbine wheel to impart a rotative force thereto, said system comprising:
    a combustor having a gas outlet adapted to be in fluid communication with a turbine engine nozzle, a fuel inlet and an oxidant inlet so that fuel may be oxidized within said combustor by an oxidant to provide hot gases at the outlet to said oxidant in a desired proportion wherein the oxygen content is greater than that found in air;
    a first pressure vessel adapted to receive liquid oxygen;
    a second pressure vessel adapted to receive liquid nitrogen;
    means establishing a flow path between said vessels on the one hand and said oxidant inlet on the other, including two conduits in hydraulic parallel and in heat exchange relation with said combustor, one of said conduits receiving liquid nitrogen and the other receiving liquid oxygen from said vessels;
    a mixing valve connected to said conduits for mixing heated oxygen and heated nitrogen flowing.

11. The system of claim 10 further including a pump in each of said conduits.

12. A starting system for a turbine engine including a rotatable turbine wheel and a nozzle for directing hot gases against the turbine wheel to impart a rotative force thereto, said system comprising:
    a combustor having a gas outlet adapted to be in fluid communication with a turbine engine nozzle, a fuel inlet and an oxidant inlet so that fuel may be oxidized within said combustor by an oxidant to provide hot gases at the outlet;
    a first pressure vessel adapted to receive a first oxidant component;
    a second pressure vessel adapted to receive a second oxidant component;
    means establishing a flow path between said vessels on the one hand and said oxidant inlet on the other, including a section in heat exchange relation with said combustor; and
    mixing means in said flow path establishing means for mixing said oxidant components as they flow therein to provide oxidant to said oxidant inlet.

* * * * *